United States Patent [19]
Takano et al.

[11] Patent Number: 6,013,298
[45] Date of Patent: Jan. 11, 2000

[54] METHOD OF MAKING A REDUCED SALT BREAD DOUGH PRODUCT AND REDUCED SALT BREAD DOUGH PRODUCT

[75] Inventors: Hiroyuki Takano, Tsukuba; Toshihito Kakiuchi, Tsuchiura; Naomi Ise, Tsukuba, all of Japan

[73] Assignees: Fujisawa Pharmaceutical Co., Ltd., Osaka; National Food Research Institute, Ministry of Agriculture, Forestry and Fisheries, Tsukuba, both of Japan

[21] Appl. No.: 08/849,137

[22] PCT Filed: Nov. 28, 1995

[86] PCT No.: PCT/JP95/02414

§ 371 Date: Jun. 5, 1997

§ 102(e) Date: Jun. 5, 1997

[87] PCT Pub. No.: WO96/17521

PCT Pub. Date: Jun. 13, 1996

[30] Foreign Application Priority Data

Dec. 7, 1994 [JP] Japan .................................. 6-303381

[51] Int. Cl.$^7$ ........................................................ A21D 2/08
[52] U.S. Cl. .......................... 426/496; 426/289; 426/534; 426/549; 426/650; 426/653; 426/442; 426/446; 426/504
[58] Field of Search ..................................... 426/289, 296, 426/534, 549, 551, 650, 653, 654, 442, 443, 446, 496, 504

[56] References Cited

U.S. PATENT DOCUMENTS

| | | | |
|---|---|---|---|
| 4,741,907 | 5/1988 | Furuhashi | 426/551 X |
| 5,605,697 | 2/1997 | Asano et al. | 426/654 X |

FOREIGN PATENT DOCUMENTS

| | | |
|---|---|---|
| 4-200341 | 7/1992 | Japan . |
| 5-23096 | 2/1993 | Japan . |
| 6-62723 | 3/1994 | Japan . |
| 94/09650 | 5/1994 | WIPO . |

OTHER PUBLICATIONS

Marsh, A. C., "Processes and Formulations That Affect the Sodium Content of Foods", Food Technology, vol. 37, No. 7, pp. 45–49, Jul. 1983.

Strong, L. R., "the functional properties of salt in bakery products", The Bakers Digest, vol. 43, No. 5, pp. 55–59, Feb. 1969.

Tomomi Kono, "Seasoning New Food Encyclopedia 7", pape 6, Apr. 1992.

*Primary Examiner*—Milton Cano
*Attorney, Agent, or Firm*—Oblon, Spivak, McClelland, Maier & Neustadt, P.C.

[57] ABSTRACT

A sodium chloride substitute containing alkali metal gluconates utilizable for bread and other baked goods; doughs of bread and other baked goods prepared by using the gluconate alone or together with sodium chloride; and bread and other baked goods produced from the doughs.

6 Claims, No Drawings

METHOD OF MAKING A REDUCED SALT BREAD DOUGH PRODUCT AND REDUCED SALT BREAD DOUGH PRODUCT

TECHNICAL FIELD

The present invention relates to bread and other baked goods made by using alkali metal gluconates.

BACKGROUND ART

Sodium chloride is employed as a starting ingredient for making bread and other baked goods. It is used not for saltiness, but for improving rheological properties of doughs and a workability, for seasoning, and for improving a shelf life of goods and the like. Thus, it is quite useful. With respect to the amount of sodium chloride in various baked goods, it is, based on 100 g of wheat flour, between 0.5 and 2% in bread, between 1.55 and 3.5% in pie dough, between 0.5 and 1.5% in cakes, as many as 3% in biscuits, and between 1.5 and 2% in cookies and crackers. In western countries where the intake of baked goods is relatively high, how to decrease the sodium intake in baked goods is a serious problem. This is also a big problem in our country where bread as a secondary staple food next to rice diet is consumed much. Studies on substitutes for sodium chloride have been conducted in every country.

The use of potassium chloride and the like as substitutes for sodium chloride has been examined. However, potassium chloride has a strong bitterness, and is actually less effective as a substitute for sodium chloride. Further, no other useful substitutes have been found in view of qualities, a workability and the like.

Baked goods for persons suffering from renal diseases and the like who have to limit the sodium intake must be made without using sodium chloride. Further, it is difficult to make saltless bread either mechanically or manually in view of a workability and the like because of a stickiness of dough. Sodium chloride has an important role as an agent for stabilizing properties of bread dough and maintaining hardness and the like. Meanwhile, saltless cakes or crackers have been made, but they are lacking in the flavor. In this respect, if a substitute for sodium chloride is found, the consumption of bread is increased for persons who have to restrict the sodium intake. Further, cookies or crackers having an excellent flavor can be advantageously provided as compared with the conventional saltless goods, making the eating habits abundant.

DISCLOSURE OF THE INVENTION

The present inventors have engaged in studies on the use of products which substitute sodium chloride as starting ingredients for bread and other baked goods, and have focussed on alkali metal gluconates such as sodium gluconate and potassium gluconate which were not studied with respect to the use in baked goods. Consequently, they have arrived at a new epochal knowledge that alkali metal gluconates are used in combination with sodium chloride or substitute sodium chloride by 100% when making various baked goods including bread, whereby qualities of the baked goods are equal or similar to those of goods obtained upon using sodium chloride. They have conducted further studies, and have completed the present invention.

Accordingly, the present invention is to provide agents containing alkali metal gluconates, namely, a sodium chloride substitute starting ingredient (sodium chloride-like starting ingredient) or a sodium chloride reducing agent for bread and other baked goods, an agent for improving qualities of bread and other baked goods, an agent for increasing a specific volume of bread and other baked goods, an agent for improving a workability in making bread and other baked goods, and an agent for stabilizing doughs of bread and other baked goods. Further, the present invention is to provide dough, chilled dough, frozen dough and a mix of bread and other baked goods containing alkali metal gluconates. Still further, the present invention is to provide bread and other baked goods containing an alkali metal gluconate singly or in combination with sodium chloride (namely, bread and other baked goods containing an alkali metal gluconate and sodium chloride, and low-salt or saltless bread and other baked goods containing an alkali metal gluconate), as well as a method of making the same.

Examples of the alkali metal gluconate which is used in the present invention include potassium gluconate, sodium gluconate and the like.

In the present invention, the dough, the chilled dough and the frozen dough of bread and other baked goods as well as the bread and other baked goods refer to those which are made in a usual manner upon using one or more of grain flours such as wheat flour, barley flour, rye flour, rice flour and the like (mixtures of these with flours of starches such as tapioca, sweet potato and potato) (as starting flour) and an alkali metal gluconate singly or in combination with sodium chloride as essential starting ingredient. In the case of bread, yeast (such as compressed yeast and dry yeast for non-frozen dough or frozen dough or those having a refrigeration resistance), a leavening agent such as a baking powder or the like, and other raw materials are added thereto as required. In the case of the baked goods other than bread, the leavening agent is added or not added thereto, and other raw materials are used as required.

Specific examples of such a bread are classified as follows depending on the amount of sugar to be added.

(1) non-sugar bread which is made without the addition of sugar to raw flour such as wheat flour or the like: French bread, rye bread and the like (2) low-sugar bread which is made by adding from 2 to 10% of sugar to raw flour: a white bread, English bread, pain coupe, croissant, butter roll, one loaf, muffin and the like (3) high-sugar bread which is made by adding from 20 to 40% of sugar to raw flour: sweet baked breads such as panettone, ann bread, jam bread, cream bread, fried bread, steamed bread and the like (4) steamed manju, baked manju, Chinese manju and the like, and doughnuts as well as pizza, buns and the like which are made by the above-mentioned method Examples of the baked goods other than bread include pie, sponge cakes, kasutera, biscuits, cookies, crackers, hardtacks and fried dough cakes and the like. Examples of the mix include a doughnut mix, a hot cake mix, a coupling cake mix, a pancake mix, a layer cake mix, a muffin mix, a bread mix, a roll mix, a yeast doughnut mix, an angel food mix, a sponge cake mix, a pizza mix, an okonomiyaki, a bicrust mix and the like.

In the present invention, the amount of the alkali metal gluconate which is used alone is, for example, between 0.5 and 10%, preferably between 1 and 3% based on the amount of wheat flour in the case of the non-sugar bread typified by French bread and the low-sugar bread typified by a white bread. It is between 0.2 and 4%, preferably between 0.4 and 1% in the case of the high-sugar bread typified by the sweet baked bread. It is between 0.5 and 10%, preferably between 1 and 3% based on the amount of wheat flour in the case of the manju, doughnuts, pizza and buns.

Further, it is between 0.5 and 3% based on the amount of wheat flour in the case of the baked goods other than bread.

When the alkali metal gluconate is used in combination with sodium chloride, the ratio of the alkali metal gluconate to sodium chloride is between 10:90 and 99:1, preferably between 25:75 and 75:25. The total amount of both of these components is between 0.5 and 10%, preferably between 1 and 3% in the non-sugar bread and low-sugar bread. It is between 0.2 and 4%, preferably between 0.4 and 1% in the high-sugar bread. It is between 0.5 and 10%, preferably between 1 and 3% in the manju, doughnuts, pizza, buns and the like. It is between 0.5 and 3% in the baked goods other than bread.

In the present invention, the dough, chilled dough and frozen dough of bread and other baked goods as well as bread and other baked goods can be made by the conventional methods as such.

That is, methods using ordinary yeasts or baking powders singly or in combination, such as a straight dough method, a sponge dough method, an overnight dough method, a method using frozen dough, a continuous dough-making system and the like are all available.

An example of a method of making bread is shown below.

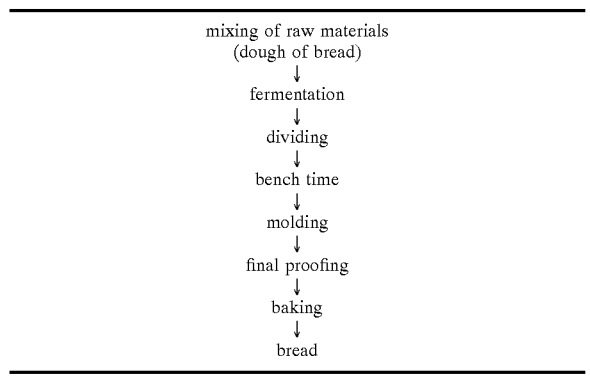

The frozen dough is frozen after mixing the raw materials, further after molding, and still further after final proofing (these freezings are rapidly conducted at from −40° C. to −60° C.), and freeze-stored at approximately −20° C. In this case, the yeast used is preferably yeast for frozen dough.

Even when using dough in which a part or the whole (100%) of sodium chloride is substituted with alkali metal gluconates such as sodium gluconate, potassium gluconate and the like according to the present invention, it is possible to obtain bread and other baked goods which are excellent in terms of a specific volume, appearance, internal characteristics, flavor and the like.

In the present invention, the alkali metal gluconate is excellent as a sodium chloride substitute starting ingredient (sodium chloride-like starting ingredient) or a sodium chloride reducing agent for bread and other baked goods. Further, the alkali metal gluconate which is used singly or in combination with sodium chloride is useful as an agent for improving qualities of bread and other baked goods, such as a specific volume, grain and softness, and as an agent for improving a shelf life. Still further, it is excellent as an agent for improving a workability in making bread and other baked goods (such as prevention of stickiness of dough, stabilization of properties, shortening of a fermentation time or the like) and as an agent for stabilizing doughs of bread and other baked goods (stabilization of properties, maintenance of hardness and the like). Furthermore, dough, chilled dough and frozen dough containing the same for bread and other baked goods are excellent.

The present invention can reduce the intake of sodium chloride by 50% or more or reduce the intake of sodium contained by 20% or more in bread and other baked goods which can be made according to the present invention without having an influence on a workability and without providing an appreciable difference in qualities. Accordingly, they serve also as low-salt or saltless healthy goods.

The above-mentioned effects provided by the alkali metal gluconates in the present invention are also found in the use of the same in combination with potassium chloride.

The present invention is illustrated specifically by referring to the following Examples.

EXAMPLE 1

Use of sodium gluconate or potassium gluconate in making a white bread:

A white bread was made by a straight dough method. The formulation of raw materials is as follows.

TABLE 1

| Formulation of raw materials for a white bread | |
|---|---|
| wheat flour (bread-making flour) | 100 |
| compressed yeast | 2 |
| granulated sugar | 5 |
| sodium chloride | 2 |
| shortening | 5 |
| water | 66 |

The procedure of making a white bread is described below.

Procedure of making a white bread:

kneading of bread dough fermentation: 30° C., 100 minutes; during that time, punching was conducted once.

dividing: The mixture was divided into doughs each corresponding to 100 g of wheat flour.

bench time: 15 minutes molding: one loaf type final proofing: 38° C., 85% RH, 55 minutes baking: 200° C., 20 minutes The formulation of raw materials for bread and bread-making conditions were based on the recipe described in "Evaluation Methods of Bakers' Yeast", Japan Yeast Industry Association (January 1991). However, vitamin C was not used in the formulation. The mixture was divided into doughs each corresponding to 100 g of wheat flour, and each dough was molded into one loaf type. The final proofing was conducted for a fixed period of time.

Sodium gluconate or potassium gluconate substituted sodium chloride by 25%, 50%, 75% and 100%.

Immediately after the completion of the baking, the weight and the volume of bread were measured, and the specific volume (volume/weight of bread) was calculated. The resulting white bread was allowed to stand at room temperature for 1 hour, and packed in a polyethylene bag. After 24 hours of the baking, the qualities thereof were evaluated according to "Evaluation Methods of Bread" described in "Evaluation Methods of Bakers' Yeast", Japan Yeast Industry Association.

The results of evaluation of the qualities are shown below.

TABLE 2

Qualities of a white bread made by using sodium gluconate:

| sodium chloride (%) | GNa 1) (%) | Volume of bread (ml) | Specific volume | Score | Rank 2) |
|---|---|---|---|---|---|
| 2.0 | 0 | 790 | 5.3 | 84 | B |
| 1.5 | 0.5 | 817 | 5.4 | 85 | B |
| 1.0 | 1.0 | 820 | 5.4 | 83 | B |
| 0.5 | 1.5 | 820 | 5.3 | 79 | C |
| 0 | 1.5 | 780 | 5.3 | 76 | C |
| 0 | 2.0 | 780 | 5.4 | 77 | C |

1) GNa: sodium gluconate (This is the same with the following.)
2) Rank: according to 5 grades A to E. (A - good, B - slightly good, C - common, D - slightly poor, E - poor) (This is the same with the following.)

TABLE 3

Qualities of a white bread made by using potassium gluconate:

| sodium chloride (%) | GK 1) (%) | Volume of bread (ml) | Specific volume | Score | Rank |
|---|---|---|---|---|---|
| 2.0 | 0 | 790 | 5.3 | 84 | B |
| 1.5 | 0.5 | 805 | 5.4 | 84 | B |
| 1.0 | 1.0 | 790 | 5.3 | 82 | B |
| 0.5 | 1.5 | 795 | 5.4 | 80 | C |
| 0 | 1.5 | 790 | 5.3 | 75 | C |
| 0 | 2.0 | 800 | 5.3 | 75 | C |

1) GK: potassium gluconate (This is the same with the following.)

Even when a part or the whole of sodium chloride was substituted with sodium gluconate or potassium gluconate, the amount of water added in kneading the dough was the same as that of water in the case of using sodium chloride alone. The specific volume of the final bread was equal to, or more than, the specific volume of bread made by using sodium chloride alone. With respect to the evaluation of qualities, rank C (common) or higher was given to all of the final goods. Thus, there was no problem in the bread qualities. Meanwhile, the bread which was made by using sodium gluconate or potassium gluconate alone without the use of sodium chloride was given rank C, and score thereof was slightly inferior to that of bread made by using sodium chloride. This was because the former was different in flavor from the latter. However, the former is said to fully satisfy the desire to eat bread among persons who have to restrict the sodium chloride intake.

The sodium content in bread made by using sodium gluconate is calculated from the amounts of sodium chloride and sodium gluconate as follows. It is approximately 0.8 g in bread made by using sodium chloride alone. To make the sodium intake half or less, 75% of sodium chloride has to be substituted with sodium gluconate. When using sodium gluconate alone, the use of 2% leads to the intake of approximately 0.2 g. Thus, the sodium intake can be reduced by 75% as compared with that in bread made by using sodium chloride. Further, when the amount of sodium gluconate is 1.5%, the sodium intake can be reduced by 80%.

TABLE 4

Sodium intake (calculated value) in a white bread (per meal) made by using 100 g of wheat flour:

| sodium chloride (%) | GNa (%) | Na from sodium chloride (mg) | Na from GNa (mg) | Total Na intake (mg) | Percent intake (%) |
|---|---|---|---|---|---|
| 2.0 | 0 | 787 | 0 | 787 | 100 |
| 1.5 | 0.5 | 590 | 53 | 643 | 82 |
| 1.0 | 1.0 | 394 | 105 | 499 | 63 |
| 0.5 | 1.5 | 197 | 158 | 355 | 45 |
| 0 | 1.5 | 0 | 158 | 158 | 20 |
| 0 | 2.0 | 0 | 211 | 211 | 27 |

On the other hand, the sodium content in bread made by using potassium gluconate is calculated from the amounts of sodium chloride and potassium gluconate as follows. In order to make the sodium intake half or less, 50% or more of sodium chloride may be substituted with potassium gluconate. When using potassium gluconate alone, the sodium intake can be reduced to zero.

TABLE 5

Sodium intake (calculated value) in a white bread (per meal) made by using 100 g of wheat flour:

| sodium chloride (%) | GK (%) | Na from sodium chloride (mg) | K from GK (mg) | Total Na intake (mg) | Percent Na intake (%) |
|---|---|---|---|---|---|
| 2.0 | 0 | 787 | 0 | 787 | 100 |
| 1.5 | 0.5 | 590 | 49 | 590 | 75 |
| 1.0 | 1.0 | 394 | 98 | 394 | 50 |
| 0.5 | 1.5 | 197 | 147 | 197 | 25 |
| 0 | 1.5 | 0 | 147 | 0 | 0 |
| 0 | 2.0 | 0 | 196 | 0 | 0 |

EXAMPLE 2

Use of sodium gluconate or potassium gluconate in making a sweet baked bread:

A sweet baked bread was made by a straight dough method. The formulation of raw materials is as follows.

TABLE 6

| Formulation of raw materials for a sweet baked bread | |
|---|---|
| wheat flour (bread-making flour) | 70 |
| wheat flour (semi-strong flour) | 30 |
| compressed yeast | 4 |
| granulated sugar | 25 |
| sodium chloride | 0.7 |
| shortening | 6 |
| skimmilk powder | 2 |
| water | 56 |

The procedure of making a sweet baked bread is described below.

Procedure of making a sweet baked bread:
 kneading of sweet baked bread dough
 fermentation: 30° C., 100 minutes; during that time, punching was conducted once.
 dividing: The mixture was divided into doughs each corresponding to 100 g of wheat flour.
 bench time: 25 minutes
 molding: one loaf type final proofing: 38° C., 85% RH, 50 minutes
baking: 200° C., 17 minutes The formulation of raw materials for a sweet baked bread and sweet baked bread-making conditions were based on the recipe described in "Evaluation Methods of Bakers' Yeast", Japan Yeast Industry Association (January 1991). However, vitamin C was not used in the formulation. The mixture was divided into doughs each corresponding to 100 g of wheat flour, and each dough was molded into one loaf type. The final proofing was conducted for a fixed period of time.

Sodium gluconate was used in an amount of 0, 0.2, 0.5 and 0.7% based on the wheat flour, and the amount of sodium chloride was reduced by the amount of sodium gluconate used.

Immediately after the completion of the baking, the weight and the volume of the sweet baked bread were measured, and the specific volume (volume/weight of the sweet baked bread) was calculated. The resulting sweet baked bread was allowed to stand at room temperature for 1 hour, and packed in a polyethylene bag. After 24 hours of the baking, the qualities thereof were evaluated according to "Evaluation Methods of Bread" described in "Evaluation Methods of Bakers' Yeast", Japan Yeast Industry Association.

The results of evaluation of the qualities are shown below.

TABLE 7

Qualities of a sweet baked bread made by using sodium gluconate:

| sodium chloride (%) | GK 1) (%) | Volume of a sweet baked bread (ml) | Specific volume | Score | Rank |
| --- | --- | --- | --- | --- | --- |
| 0.7 | 0 | 885 | 5.1 | 81 | B |
| 0.5 | 0.2 | 900 | 5.2 | 83 | B |
| 0.2 | 0.5 | 910 | 5.3 | 81 | B |
| 0 | 0.7 | 920 | 5.4 | 81 | B |

TABLE 8

Qualities of a sweet baked bread made by using potassium gluconate:

| sodium chloride (%) | GK 1) (%) | Volume of a sweet baked bread (ml) | Specific volume | Score | Rank |
| --- | --- | --- | --- | --- | --- |
| 0.7 | 0 | 885 | 5.1 | 81 | B |
| 0.5 | 0.2 | 890 | 5.1 | 82 | B |
| 0.2 | 0.5 | 900 | 5.2 | 82 | B |
| 0 | 0.7 | 920 | 5.4 | 81 | B |

Even when a part or the whole of sodium chloride was substituted with sodium gluconate or potassium gluconate, the amount of water added in kneading the dough was the same as that of water in the case of using sodium chloride alone. The specific volume of the final sweet baked bread was equal to, or more than, the specific volume of the sweet baked bread made by using sodium chloride alone. Score of all the sweet baked breads was higher than 80, and Rank was B. Thus, there was no problem in the sweet baked bread qualities including the taste. Thus, the sweet baked bread is said to fully satisfy the desire to eat bread among persons who have to restrict the sodium chloride intake.

The sodium content in the sweet baked bread made by using sodium gluconate is calculated from the amounts of sodium chloride and sodium gluconate as follows. It is approximately 275 mg in the sweet baked bread made by using sodium chloride alone. To make the sodium intake half or less, approximately 70% of sodium chloride has to be substituted with sodium gluconate. When using sodium gluconate alone, the use of 0.7% leads to the intake of approximately 74 mg. Thus, the sodium intake can be reduced by 73% as compared with that in a white bread made by using sodium chloride.

TABLE 9

Sodium intake (calculated value) in a sweet baked bread made by using 100 g of wheat flour:

| sodium chloride (%) | GNa (%) | Na from sodium chloride (mg) | Na from GNa (mg) | Total Na intake (mg) | Percent Na intake (%) |
| --- | --- | --- | --- | --- | --- |
| 0.7 | 0 | 275 | 0 | 275 | 100 |
| 0.5 | 0.2 | 197 | 21 | 218 | 79 |
| 0.2 | 0.5 | 79 | 53 | 132 | 48 |
| 0 | 0.7 | 0 | 74 | 74 | 27 |

The sodium content in the sweet baked bread made by using potassium gluconate is calculated from the amounts of sodium chloride and potassium gluconate as follows. The sodium content is 275 mg in the sweet baked bread made by using sodium chloride alone. When 50% or more of sodium chloride is substituted with potassium gluconate, the sodium intake is less than half of the above-mentioned sodium intake. When using potassium gluconate alone, the sodium intake can be reduced to zero.

TABLE 10

Sodium intake (calculated value) in a sweet baked bread made by using 100 g of wheat flour:

| sodium chloride (%) | GK (%) | Na from sodium chloride (mg) | K from GK (mg) | Total Na intake (mg) | Percent Na intake (%) |
| --- | --- | --- | --- | --- | --- |
| 0.7 | 0 | 275 | 0 | 275 | 100 |
| 0.5 | 0.2 | 197 | 20 | 197 | 72 |
| 0.2 | 0.5 | 79 | 49 | 79 | 18 |
| 0 | 0.7 | 0 | 69 | 0 | 0 |

EXAMPLE 3

Example of frozen dough:

TABLE 11

| Formulation of raw materials | |
| --- | --- |
| wheat flour (bread-making flour) | 100 |
| yeast for frozen dough (compressed yeast) | 4 |
| granulated sugar | 5 |
| sodium gluconate | 2 |
| shortening | 5 |
| water | 66 |

Method:

Wheat flour which had been sieved twice was charged into a mixing bowl, and a mixture obtained by dissolving yeast, granulated sugar and sodium gluconate with a part of water was added to the wheat flour in the mixing bowl. Further, wheat flour was added thereto such that the container used in the dissolution was washed with the remaining water. All of the raw materials except the shortening were charged into the mixing bowl, and mixed at low speed for 2 minutes, at medium speed for 2 minutes and at high speed for 1 minute using a bread-making mixer, and the shortening was added thereto. The mixture was further mixed at low speed for 2 minutes, at medium speed for 2 minutes and at high speed for 2 minutes to obtain bread dough. After the dough was kneaded, it was fermented at 30° C. for 70 minutes, punched, then packed into a polyethylene bag, and frozen at −20° C. to produce the frozen dough.

EXAMPLE 4

Use of sodium gluconate or potassium gluconate in making French bread

French bread was made by a straight dough method. The formulation of raw materials is as follows.

TABLE 12

Formulation of raw materials for French bread

|  | Non-frozen dough | Frozen dough |
|---|---|---|
| wheat flour (bread-making flour) | 100 | 100 |
| yeast food | 0.5 | 1.0 |
| dry yeast | 0.8 |  |
| yeast for frozen dough (compressed yeast) |  | 4 |
| malt extract | 0.3 | 0.3 |
| sodium chloride | 2 | 2 |
| water | 66 | 63 |

The procedure of making French bread is described below.

Procedure of making French bread:

when using non-frozen dough:
   kneading of bread dough:
   fermentation: 30° C., 120 minutes; during that time, punching was conducted once.
   dividing: 300 g as dough
   bench time: 15 minutes
   molding: baguette type
   final proofing: 30° C., 70% RH, 70 to 75 minutes[1)]
   baking: 230° C., 35 minutes when using frozen dough:
   kneading of bread dough:
   fermentation: 20° C., 20 minutes
   dividing: 300 g as dough
   bench time: 15 minutes
   molding: baguette type
   freezing conditions: rapid freezing at −30° C.
   freeze-storing: storing at −20° C. for 1 week
   thawing conditions: 5° C., 3 hours −20° C., 2 hours
   final proofing: 30° C., 70% RH, 33 to 40 minutes[1)]
   baking: 230° C., 35 minutes

[1)] The time of the final proofing was adjusted according to the fermented state, and the time considered optimum was employed.

Sodium gluconate or potassium gluconate substituted 75% and 100% of sodium chloride. After the completion of the baking, the qualities of the resulting bread were evaluated according to the "Evaluation Methods of Bakers' Yeast".

The results of evaluation of the qualities are shown below.

TABLE 13

Qualities of French bread made by using sodium gluconate or potassium gluconate (non-frozen dough):

| sodium chloride (%) | GNa (%) | GK (%) | Volume of bread (ml) | Specific volume | Score | Rank |
|---|---|---|---|---|---|---|
| 2.0 | 0 | 0 | 1520 | 6.8 | 80 | B |
| 0 | 2.0 | 0 | 1430 | 6.4 | 70 | C |
| 0 | 0 | 2.0 | 1510 | 6.8 | 74 | C |

TABLE 14

Qualities of French bread made by using sodium gluconate or potassium gluconate (frozen dough):

| sodium chloride (%) | GNa (%) | GK (%) | Volume of bread (ml) | Specific volume | Score | Rank |
|---|---|---|---|---|---|---|
| 2.0 | 0 | 0 | 1970 | 8.9 | 84 | B |
| 0.5 | 1.5 | 0 | 2080 | 9.5 | 74 | C |
| 0 | 2.0 | 0 | 1920 | 8.6 | 73 | C |
| 0.5 | 0 | 1.5 | 2040 | 9.2 | 76 | C |
| 0 | 0 | 2.0 | 1960 | 8.7 | 75 | C |

Even when a part or the whole of sodium chloride was substituted with sodium gluconate or potassium gluconate, the amount of water added in kneading the dough was the same as that of water in the case of using sodium chloride alone. Thus, there was no problem in operation. The specific volume of this bread was equal to that of bread made by using sodium chloride alone. Rank was C, and qualities were at a common or higher level.

EXAMPLE 5

Use of sodium gluconate or potassium gluconate in making a white bread of frozen dough A white bread was made by a straight dough method. The formulation of raw materials is as follows.

TABLE 15

Formulation of raw materials for a white bread

| wheat flour | 100 |
|---|---|
| compressed yeast | 4 |
| granulated sugar | 5 |
| sodium gluconate | 2 |
| shortening | 5 |
| water | 66 |

A procedure of making a white bread is described below.

Procedure of making a white bread:

when using compressed yeast (yeast for non-frozen dough):
   kneading of bread dough:
   dividing: dough corresponding to 100 g of wheat flour
   freezing conditions: freezing at −20° C.
   freeze-storing: storing at −20° C. for 1 week
   thawing conditions: 30° C., 90 minutes
   bench time: 30 minutes
   molding: one loaf type
   final proofing: 30° C., 85% RH, 55 minutes
   baking: 200° C., 25 minutes when using compressed yeast (yeast for frozen dough):
   fermentation: 20° C., 40 minutes dividing: dough corresponding to 100 g of wheat flour
freezing conditions: freezing at −20° C.
freeze-storing: storing at −20° C. for 1 week
thawing conditions: 30° C., 90 minutes
bench time: 30 minutes
molding: one loaf type
final proofing: 30° C., 85% RH, 42 minutes[1)]
baking: 200° C., 25 minutes

[1] The time of the final proofing was adjusted according to the fermented state, and the time considered optimum was employed.

Sodium gluconate or potassium gluconate substituted 75% and 100% of sodium chloride.

Immediately after the completion of the baking, the weight and the volume of the resulting white bread were measured, and the specific volume (volume/weight of bread) was calculated. The white bread was allowed to stand at room temperature for an hour, and then packed in a polyethylene bag. After 24 hours of the baking, the qualities thereof were evaluated according to "Evaluating Methods of Bread" described in "Evaluation Methods of Bakers' Yeast", Japan Yeast Industry Association.

The results of evaluation of the qualities are shown below.

TABLE 16

Qualities of a white bread made from frozen dough by using sodium gluconate or potassium gluconate (using yeast for non-frozen dough):

| sodium chloride (%) | GNa (%) | GK (%) | Volume of bread (ml) | Specific Volume | Score | Rank |
|---|---|---|---|---|---|---|
| 2 | 0 | 0 | 837 | 5.6 | 83 | B |
| 0.5 | 1.5 | 0 | 840 | 5.6 | 81 | B |
| 0 | 2.0 | 0 | 845 | 5.7 | 77.5 | C |
| 0.5 | 0 | 1.5 | 836 | 5.6 | 78.5 | C |
| 0 | 0 | 2.0 | 853 | 5.7 | 76.5 | C |

TABLE 17

Qualities of a white bread made from frozen dough by using sodium gluconate or potassium gluconate (using yeast for frozen dough):

| sodium chloride (%) | GNa (%) | GK (%) | Volume of bread (ml) | Specific volume | Score | Rank |
|---|---|---|---|---|---|---|
| 2 | 0 | 0 | 889 | 6.1 | 91 | A |
| 0.5 | 1.5 | 0 | 954 | 6.7 | 91 | A |
| 0 | 2.0 | 0 | 931 | 6.5 | 89.5 | B |
| 0.5 | 0 | 1.5 | 945 | 6.5 | 91 | A |
| 0 | 0 | 2.0 | 903 | 6.3 | 88 | B |

Even when a part or the whole of sodium chloride was substituted with sodium gluconate or potassium gluconate, the amount of water added in kneading the dough could be the same as that of water in the case of using sodium chloride alone. Thus, there was no problem in operation. Further, the specific volume of the final white bread was equal to, or more than, the specific volume of the white bread made by using sodium chloride alone. Rank of all goods was C (common) or higher, and there was no problem in the qualities as the white bread.

EXAMPLE 6

Use of sodium gluconate or potassium gluconate in making a sweet baked bread from frozen dough:

A sweet baked bread was made by a straight dough method. The formulation of raw materials is as follows.

TABLE 18

Formulation of raw materials for a sweet baked bread

| | |
|---|---|
| wheat flour (bread-making flour) | 100 |
| compressed yeast | 8 |
| granulated sugar | 25 |
| sodium chloride | 0.7 |
| shortening | 6 |
| skimmilk powder | 2 |
| water | 56 |

The procedure of making a sweet baked bread is described below.

Procedure of making a sweet baked bread:

when using compressed yeast (yeast for non-frozen dough)
  kneading of sweet baked bread dough:
  dividing: dough corresponding to 100 g of wheat flour
  freezing conditions: freezing at −20° C.
  freeze-storing: storing at −20° C. for 1 week
  thawing conditions: 30° C., 90 minutes
  bench time: 30 minutes
  molding: one loaf type
  final proofing: 30° C., 85% RH, 50 minutes
  baking: 200° C., 17 minutes when using compressed yeast (yeast for frozen dough)
  kneading of sweet baked bread dough:
  fermentation: 20° C., 60 minutes
  dividing: dough corresponding to 100 g of wheat flour
  freezing conditions: freezing at −20° C.
  freeze-storing: storing at −20° C. for 1 week
  thawing conditions: 30° C., 90 minutes
  bench time: 30 minutes
  molding: one loaf type
  final proofing: 30° C., 85% RH, 32 minutes
  baking: 200° C., 17 minutes Sodium gluconate or potassium gluconate substituted 75% and 100% of sodium chloride. Immediately after the completion of the baking, the weight and the volume of the sweet baked bread were measured, and the specific volume (volume/weight of the sweet baked bread) was calculated. The resulting sweet baked bread was allowed to stand at room temperature for 1 hour, and then packed in a polyethylene bag. After 24 hours of the baking, the qualities thereof were evaluated according to "Evaluation Methods of Bread" described in "Evaluation Methods of Bakers' Yeast", Japan Yeast Industry Association.

The results of evaluation of the qualities are shown below.

TABLE 19

Qualities of a sweet baked bread made from frozen dough using sodium gluconate or potassium gluconate (using compressed yeast (yeast for non-frozen dough)):

| sodium chloride (%) | GNa (%) | GK (%) | Volume of bread (ml) | Specific volume | Score | Rank |
|---|---|---|---|---|---|---|
| 0.7 | 0 | 0 | 930 | 5.5 | 84 | B |
| 0.175 | 0.525 | 0 | 933 | 5.4 | 83 | B |
| 0 | 0.7 | 0 | 929 | 5.5 | 84 | B |
| 0.175 | 0 | 0.525 | 944 | 5.5 | 84 | B |
| 0 | 0 | 0.7 | 942 | 5.5 | 84 | B |

TABLE 20

Qualities of a sweet baked bread made from frozen dough using sodium gluconate or potassium gluconate (using compressed yeast (yeast for frozen dough)):

| sodium chloride (%) | GNa (%) | GK (%) | Volume of bread (ml) | Specific volume | Score | Rank |
|---|---|---|---|---|---|---|
| 0.7 | 0 | 0 | 864 | 5.1 | 82 | B |
| 0.175 | 0.525 | 0 | 871 | 5.1 | 82 | B |
| 0 | 0.7 | 0 | 896 | 5.2 | 80.5 | B |
| 0.175 | 0 | 0.525 | 872 | 5.1 | 82 | B |
| 0 | 0 | 0.7 | 880 | 5.2 | 80.5 | B |

Even when a part or the whole of sodium chloride was substituted with sodium gluconate or potassium gluconate, the amount of water added in kneading the dough could be the same as that of water in the case of using sodium chloride alone. There was no problem in operation. Further, the specific volume of the final sweet baked bread was equal to, or more than, the specific volume of the sweet baked bread made by using sodium chloride alone. Rank of all goods was C (common) or higher, and there was no problem in the qualities as the white bread.

EXAMPLE 7

Use of sodium gluconate or potassium gluconate in making rye bread:

The formulation of raw materials is as follows.

TABLE 21

Formulation of raw materials for rye bread

| rye flour | 100 |
| compressed yeast | 7.4 |
| sodium chloride | 2 |
| lactic acid | 0.75 |
| acetic acid (20-% solution) | 0.165 |
| water | 82 |

The procedure of making rye bread is described below.

Procedure of making rye bread:

kneading of bread dough:
  fermentation: 30° C., 40 minutes
  molding: one loaf type (corresponding to 150 g of rye flour
  final proofing: 38° C., 85% RH, 50 minutes
  baking: 220° C., 35 minutes Sodium gluconate or potassium gluconate substituted 75% and 100% of sodium chloride.

Even when a part or the whole of sodium chloride was substituted with sodium gluconate or potassium gluconate, the amount of water added in kneading the dough could be the same as that of water in the case of using sodium chloride alone. Thus, there was no problem in operation. Further, the specific volume of the final rye bread was equal to, or more than, the specific volume of the rye bread made by using sodium chloride alone.

EXAMPLE 8

Use of sodium gluconate or potassium gluconate in making a doughnut:

The formulation of raw materials is as follows.

TABLE 22

Formulation of raw materials for a doughnut

| wheat flour (bread-making flour) | 75 |
| wheat flour (soft flour) | 25 |
| compressed yeast | 3 |
| granulated sugar | 14 |
| sodium chloride | 2 |
| shortening | 14 |
| skimmmilk powder | 6 |
| egg | 10 |
| water | 50 |

The procedure of making a doughnut is described below.

Procedure of making a doughnut:

kneading of dough: 2 minutes, using a mixer
fermentation: 30° C., 60 minutes
molding: twisted type (corresponding to 25 g of wheat flour
final proofing: 38° C., 85% RH, 20 to 25 minutes
frying: salad oil of 190° C., approximately 3 minutes The formulation of raw materials for the doughnut and the procedure of making the same were based on item "Yeast Doughnut" in "Bakers Index" (by Nakae Kou, Shokken Center). However, the final proofing time was adjusted depending on the fermented condition of dough. Sodium gluconate or potassium gluconate substituted 75% and 100% of sodium chloride.

Even when a part or the whole of sodium chloride was substituted with sodium gluconate or potassium gluconate, the amount of water added in kneading dough could be the same as that of water in the case of using sodium chloride alone. Thus, there was no problem in operation. Further, when sodium gluconate or potassium gluconate substituted sodium chloride, the fermentation proceeded quickly, making it possible to shorten the final proofing time.

EXAMPLE 9

Use of sodium gluconate or potassium gluconate in pizza pie dough:

The formulation of raw materials for pizza pie dough is as follows.

TABLE 23

Formulation of raw materials for pizza pie dough

| wheat flour (bread-making flour) | 100 |
| compressed yeast | 1 |
| sodium chloride | 2 |
| granulated sugar | 5 |
| shortening | 5 |
| water | 67 |

The procedure of making a pizza pie is described below.

Procedure of making a pizza pie:
  kneading of dough: 2 minutes, using a mixer
  fermentation: 30° C., 70 minutes
  dividing: dough corresponding to 50 g of wheat flour
  bench time: 15 minutes
  molding: square type of 15 cm×12 cm
  baking: 200° C., 6 minutes Sodium gluconate or potassium gluconate substituted 75% and 100% of sodium chloride. The day after the baking, the pizza pie with pizza sauce, cheese and the like was further baked. The resulting product was subjected to an organoleptic test to evaluate the taste thereof.

Even when a part or the whole of sodium chloride was substituted with sodium gluconate or potassium gluconate in the procedure, the operation was conducted as in the case of using sodium chloride alone, and there was no problem at all.

Meanwhile, in the organoleptic test, the taste was the same as, or better than, the taste given by using sodium chloride alone.

EXAMPLE 10

Use of sodium gluconate or potassium gluconate in cookies:

The formulation of raw materials for cookies is as follows.

TABLE 24

Formulation of raw materials for cookies

| | |
|---|---|
| wheat flour (soft flour) | 112.5 |
| sugar (powder) | 65 |
| shortening | 32 |
| sodium chloride | 1.05 |
| sodium bicarbonate | 1.25 |
| glucose solution (6.0 g/100 ml) | 16.5 |
| water | 8 |

The procedure of making cookies is described below.

Procedure of making cookies:

kneading of dough:

molding: round type (3 mm×5 cm (diameter))

baking: 200° C., 6 minutes and 20 seconds

The formulation of raw materials for cookies and the procedure of making the same were based on the recipe in A. A. C. C. (American Association of Cereal Chemistry). However, the above-mentioned molding and baking times were employed. Sodium gluconate or potassium gluconate substituted 50% and 100% of sodium chloride. After making cookies, the taste thereof was evaluated by the organoleptic test.

Even when a part or the whole of sodium chloride was substituted with sodium gluconate or potassium gluconate in the procedure, the operation was conducted as in the case of using sodium chloride alone, and there was no problem at all. Further, in the organoleptic test, the taste of the coolies was the same as, or better than, the taste of those made by using sodium chloride alone.

EXAMPLE 11

Measurement of fermentation ability of dough using a fermograph (manufactured by Atto):

The fermentation ability was tested according to "Evaluation Methods of Bakers' Yeast" (Japan Yeast Industry Association). The formulation of raw materials for dough used in the test is as follows. The test was conducted using yeast for non-frozen dough in low-sugar bread dough and yeast for frozen dough in high-sugar bread dough and non-sugar bread dough.

TABLE 25

Formulation of raw materials for doughs used in the test for fermentation ability

| Raw materials | non-sugar | low-sugar | high-sugar |
|---|---|---|---|
| wheat flour (bread-making flour) | 100 | 100 | 100 |
| compressed yeast (yeast for non-frozen dough) | | 2 | |
| compressed yeast (yeast for frozen dough) | 4 | | 6 |
| granulated sugar | | 5 | 30 |
| sodium chloride | 2 | 2 | 0.5 |
| water | 65 | 63 | 52 |

In the non-sugar dough, sodium gluconate or potassium gluconate substituted 50%, 75% and 100% of sodium chloride. In the low-sugar dough, it substituted 100% of sodium chloride. In the high-sugar dough, it substituted 50 and 100% of sodium chloride. These were compared with one another in the test.

The results of the test for fermentation ability are shown in Tables 26 to 28. The total amount (ml) of a gas after every 30 minutes is shown therein.

The amount of the gas production which shows the fermentation ability of yeast is increased in all test lots over the course of time, showing the normal state. With respect to the amount of the gas production after 90 minutes, the amount of the gas production in the lot using sodium gluconate (GNa) or potassium gluconate (GK) is larger than that of the gas production in the lot using sodium chloride alone. This means that the use of GNa or GK can shorten the fermentation time as compared with the use of sodium chloride alone.

After 2 weeks of the freezing, no appreciable decrease in the fermentation ability was identified in the lot using sodium gluconate or potassium gluconate as compared with the lot using sodium chloride alone.

A: Amount of a gas production in non-sugar dough (ml/dough corresponding to 30 g of wheat flour) using yeast for frozen dough

TABLE 26

Mixing ratio (% based on wheat flour)

| Test lot | 1 | 2 | 3 | 4 | 5 | 6 | 7 |
|---|---|---|---|---|---|---|---|
| sodium chloride | 2 | 1 | 0.5 | 0 | 1 | 0.5 | 0 |
| GNa | 0 | 1 | 1.5 | 2 | 0 | 0 | 0 |
| GK | 0 | 0 | 0 | 0 | 1 | 1.5 | 2 |

TABLE 26-1

Amount of a gas production in fermentation from immediately after kneading dough:

| Test lot Fermentation time | 1 | 2 | 3 | 4 | 5 | 6 | 7 |
|---|---|---|---|---|---|---|---|
| 30 minutes | 73 | 84 | 87 | 89 | 93 | 89 | 93 |
| 60 minutes | 173 | 190 | 198 | 202 | 205 | 201 | 208 |
| 90 minutes | 270 | 286 | 293 | 293 | 302 | 300 | 299 |
| 120 minutes | 316 | 310 | 314 | 310 | 322 | 321 | 317 |

TABLE 26-1-continued

Amount of a gas production in fermentation from immediately after kneading dough:

| Test lot Fermentation time | 1 | 2 | 3 | 4 | 5 | 6 | 7 |
|---|---|---|---|---|---|---|---|
| 240 minutes | 354 | 346 | 350 | 344 | 359 | 358 | 347 |
| 300 minutes | 367 | 358 | 362 | 353 | 370 | 368 | 355 |

TABLE 26-2

Amount of a gas production in fermentation from after 60 minutes of fermentation:

| Test lot Fermentation time | 1 | 2 | 3 | 4 | 5 | 6 | 7 |
|---|---|---|---|---|---|---|---|
| 30 minutes | 97 | 96 | 95 | 91 | 98 | 97 | 92 |
| 60 minutes | 143 | 120 | 116 | 108 | 117 | 120 | 110 |
| 90 minutes | 157 | 132 | 127 | 120 | 130 | 132 | 120 |
| 120 minutes | 166 | 141 | 137 | 128 | 139 | 142 | 128 |

TABLE 26-3

Amount of a gas production in fermentation after 2 weeks of frozen-storage from 60 minutes of fermentation:

| Test lot Fermentation time | 1 | 2 | 3 | 4 | 5 | 6 | 7 |
|---|---|---|---|---|---|---|---|
| 30 minutes | 21 | 23 | 29 | 30 | 28 | 25 | 32 |
| 60 minutes | 59 | 62 | 78 | 72 | 72 | 67 | 82 |
| 90 minutes | 103 | 104 | 127 | 113 | 119 | 113 | 133 |
| 120 minutes | 145 | 144 | 157 | 144 | 159 | 157 | 168 |

B: Amount of a gas production in low-sugar dough (ml/dough containing 30 g of wheat flour) using yeast for non-frozen dough

TABLE 27

| Mixing ratio (% based on wheat flour) | | | |
|---|---|---|---|
| Test lot | 1 | 2 | 3 |
| sodium chloride | 2 | 0 | 0 |
| GNa | 0 | 2 | 0 |
| GK | 0 | 0 | 2 |

TABLE 27-1

Amount of a gas production in fermentation from immediately after kneading dough:

| Test lot Fermentation time | 1 | 2 | 3 |
|---|---|---|---|
| 30 minutes | 27 | 39 | 41 |
| 60 minutes | 83 | 104 | 105 |
| 90 minutes | 146 | 173 | 174 |
| 120 minutes | 206 | 239 | 242 |
| 240 minutes | 387 | 423 | 429 |
| 300 minutes | 446 | 489 | 497 |

TABLE 27-2

Amount of a gas production in fermentation from after 60 minutes of fermentation:

| Test lot Fermentation time | 1 | 2 | 3 |
|---|---|---|---|
| 30 minutes | 63 | 71 | 71 |
| 60 minutes | 125 | 137 | 137 |
| 90 minutes | 180 | 192 | 194 |
| 120 minutes | 227 | 240 | 242 |

TABLE 27-3

Amount of a gas production in fermentation from 2 weeks of frozen-storage immediately after kneading of dough:

| Test lot Fermentation time | 1 | 2 | 3 |
|---|---|---|---|
| 30 minutes | 20 | 35 | 30 |
| 60 minutes | 65 | 95 | 87 |
| 90 minutes | 120 | 159 | 152 |
| 120 minutes | 179 | 221 | 213 |

TABLE 27-4

Amount of a gas production in fermentation from 2 weeks of frozen-storage after 60 minutes of fermentation:

| Test lot Fermentation time | 1 | 2 | 3 |
|---|---|---|---|
| 30 minutes | 30 | 32 | 33 |
| 60 minutes | 68 | 71 | 74 |
| 90 minutes | 110 | 113 | 116 |
| 120 minutes | 153 | 155 | 158 |

C: Amount of a gas production in high-sugar dough (ml/dough containing 30 g of wheat flour) using yeast for frozen dough

TABLE 28

| Mixing ratio (% based on wheat flour) | | | | | |
|---|---|---|---|---|---|
| Test lot | 1 | 2 | 3 | 4 | 5 |
| sodium chloride | 0.5 | 0.25 | 0 | 0.25 | 0 |
| GNa | 0 | 0.25 | 0.5 | 0 | 0 |
| GK | 0 | 0 | 0 | 0.25 | 0.5 |

TABLE 28-1

Amount of a gas production in fermentation from immediately after kneading dough:

| Test lot Fermentation time | 1 | 2 | 3 | 4 | 5 |
|---|---|---|---|---|---|
| 30 minutes | 48 | 52 | 61 | 49 | 54 |
| 60 minutes | 133 | 142 | 161 | 136 | 145 |
| 90 minutes | 230 | 242 | 271 | 235 | 248 |
| 120 minutes | 324 | 336 | 368 | 330 | 344 |
| 240 minutes | 609 | 625 | 665 | 615 | 628 |
| 300 minutes | 709 | 729 | 770 | 715 | 729 |

TABLE 28-2

Amount of a gas production in fermentation from after 60 minutes of fermentation:

| Test lot Fermentation time | 1 | 2 | 3 | 4 | 5 |
|---|---|---|---|---|---|
| 30 minutes | 97 | 100 | 110 | 99 | 103 |
| 60 minutes | 191 | 194 | 207 | 194 | 199 |
| 90 minutes | 274 | 278 | 294 | 277 | 280 |
| 120 minutes | 349 | 354 | 372 | 353 | 355 |

TABLE 28-3

Amount of a gas production in fermentation from 2 weeks of frozen-storage after 60 minutes of fermentation:

| Test lot Fermentation time | 1 | 2 | 3 | 4 | 5 |
|---|---|---|---|---|---|
| 30 minutes | 60 | 49 | 48 | 48 | 49 |
| 60 minutes | 130 | 113 | 105 | 115 | 110 |
| 90 minutes | 199 | 178 | 161 | 184 | 171 |
| 120 minutes | 265 | 239 | 215 | 251 | 231 |

We claim:

1. A method for making a reduced salt bread dough product, comprising the steps of:
   forming a bread dough from raw materials used to make bread dough;
   adding to said dough sodium gluconate singly or in combination with sodium chloride in an amount sufficient to reduce or substitute sodium chloride;
   kneading said dough; and
   fermenting said dough.

2. The method according to claim 1, wherein sodium gluconate is used singly.

3. The method according to claim 1, further comprising the step of freezing the dough.

4. A reduced salt bread dough product, comprising:
   a dough of bread prepared from raw materials used to make bread dough; and including sodium gluconate singly or in combination with sodium chloride in an amount sufficient to reduce or substitute sodium chloride, said dough having been kneaded and fermented.

5. The reduced-salt bread dough according to claim 4, wherein said sodium gluconate has been used singly.

6. The reduced-salt bread dough according to claim 4, wherein said dough has been frozen.

* * * * *